Aug. 30, 1938.  E. G. JOHANSSON  2,128,648
FUSED SWITCH BOX
Filed May 14, 1936
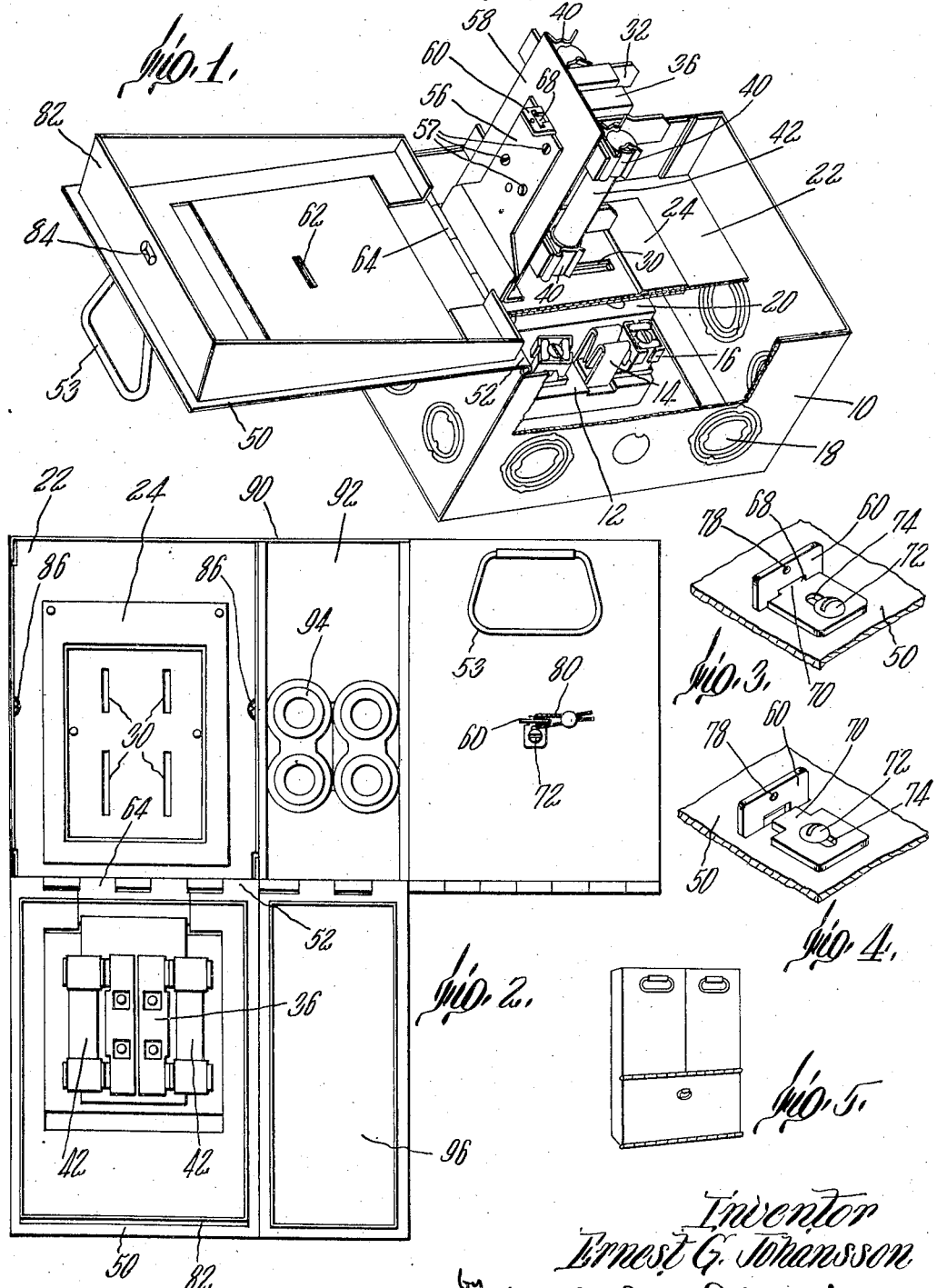
Inventor
Ernest G. Johansson
by Wright, Brown, Quinby & May
Attys Patented Aug. 30, 1938

2,128,648

UNITED STATES PATENT OFFICE 2,128,648

FUSED SWITCH BOX

Ernest G. Johansson, Watertown, Mass., assignor to The Palmer Electric & Manufacturing Co., Waltham, Mass., a corporation of Massachusetts Application May 14, 1936, Serial No. 79,724

6 Claims. (Cl. 200—50)

This application is a continuation-in-part of my copending application Serial No. 53,168, filed December 6, 1935. The invention relates to a fused electric switch in a casing or cabinet, having a door or doors which, when closed, tightly close the casing without overlapping the exterior of the casing walls, and which, when wide open, do not overlap any portion of the area bounded by the side walls of the casing, and thus do not interfere with the removal of the contents of the box. It is an object of the invention to provide a casing of this kind which can be mounted against a wall or may be embedded in a wall flush with the surface thereof.

It is a further object of the invention to provide switch-box construction such that a portion of the switch, together with all of the wiring in the box, is completely protected by a dead-front partition member, the remainder of the switch being mounted on the cover of the box and including contact blades adapted to project through narrow slots in the dead-front partition so as to engage corresponding switch terminals located in the space behind the dead-front partition member. The cover is preferably hinged to a wall of the box, a piano type hinge being preferably employed. A flange is mounted on the inner face of the cover, this flange being adapted to telescope with the walls of the box when the cover is moved to its closed position. The flange cuts off access to the interior of the box before the switch plates come into contact with the live terminals in the rear compartment of the box. Hence, whenever the portion of the switch structure attached to the cover of the box is accessible, there are no live parts in such portions.

According to the invention, the portion of the switch structure which is mounted on the cover of the box is detachably secured to the inner face thereof, means being provided, accessible on the outside of the box, for releasing the switch structure so that the cover, if desired, can be swung open without opening the switch. This makes possible inspection of the switch structure when the switch is closed. The entire switch structure may also be made accessible for examination while closed, by removing the dead-front partition, closing the box cover, releasing the switch structure from the cover, and swinging the cover open.

The invention may be embodied in a single box having one switch therein, preferably including fuses carried by the switch structure which is mounted on the cover, or may be embodied in a multiple structure consisting of two or more switch or fuse units which, if desired, may be enclosed in a single casing having a unitary dead-front member protecting portions of the switches which are mounted on the rear wall of the casing and are normally protected by the dead-front partition member.

Various other advantageous features of structure will be apparent to one skilled in the art from the disclosure of certain embodiments of the invention in the following description and on the drawing of which Figure 1 is a perspective view of a single switch unit and casing embodying the invention.

Figure 2 is an elevation of a multiple switch structure including two such units as that illustrated in Figure 1.

Figure 3 is a fragmentary perspective view of the box cover, showing a latch device for detachably securing a portion of the switch structure to the box cover.

Figure 4 is a view similar to Figure 3, showing the latch in a different position.

Figure 5 is a perspective view of another multiple switch structure, showing the units differently arranged.

In Figure 1 there is illustrated a metal casing 10 adapted to hold a single switch. This switch, as shown, may consist of a block 12 of porcelain or other suitable insulating material on which are mounted four conventional contact elements 14, one of which appears in Figure 1. Each of these contact elements is connected to a corresponding switch terminal 16 adapted to receive the stripped ends of connecting wires not shown. The wires may enter at any convenient point through holes in the walls of the cabinet which may be made by knocking out one or more disks 18 in a manner well known in the art. The insulation block 12, as shown, includes a central raised rib 20 which separates two of the contact elements 14 and their corresponding terminals 16 from the other two contact elements and terminals which are on the further side of the rib 20. Fitted within the box 10 is a dead-front partition member 22, the edges of this member abutting the side and end walls of the box. This member is preferably arranged parallel to the rear wall of the box and may rest against the forward face of the rib 20, thus more effectively separating the switch elements on one side of the rib from the switch elements on the other side. The partition member 22 may conveniently be made of sheet metal having a rectangular opening provided therein, this opening being bridged by sheets or plates 24 of fiber or other suitable insulating material, two such sheets being indicated in Figure 1, the marginal portions of which are secured to opposite faces of the metal portion of the dead-front partition member. The insulating sheets 24 are provided with four narrow slots 30, these slots being positioned respectively in front of the contact elements 14. A set of four contact blades 32 are arranged to project through the slots 30 for contact with respective contact elements 14. These blades 32, as shown, may be mounted on a suitable carrier or block 36 of insulating material on which may also be mounted fuse-holding clips 40, these clips being electrically connected respectively with the several contact blades 32. The fuse clips illustrated on the drawing are of the type adapted to hold cartridge fuses 42 of conventional type. The carrier or block 36 is normally secured to the inner face of the box cover 50, this cover being hinged as at 52 to a side wall of the casing 10. Thus, when the cover is swung open, the switch is thereby opened. Likewise, when the cover is swung shut, the switch is also shut, the contact blades 32 passing through the slots 30 to engage respective contact elements 14. The cover 50 may be provided with a bail or handle 53 to facilitate opening and shutting.

According to the present invention, the switch structure, which normally is attached to the box cover 50 so as to move therewith, is detachable therefrom by means accessible on the outside of the box so that the switch structure can be released from the box cover when the box is closed. To this end, the insulation block 36 is secured to the inner face of a metal plate 56 as by a plurality of screws 57 which are accessible at the outer face of the plate 56 when the cover 50 is swung back, a fiber shield 58 being interposed, if desired, to space the plate 56 from the nearest charged metal portions of the fuse clips 40. The plate 56 is provided with a tongue 60 bent up therefrom and adapted to pass through a narrow slot 62 in the box cover 50. For convenience, the metal plate 56 may be hinged as at 64 to the box wall so that the tongue 60 will be guided into the slot 62 when the carrier 36 and the box cover are brought together. The tongue 60 is provided with a slot 68 adapted to receive a latch 70 which is slidable against the outer face of the box cover 50. When the latch 70 is in the position illustrated in Figure 3, it projects through the slot 68 and locks the carrier 36 against the inner face of the box cover. Any suitable device may be employed to retain the latch 70 in its locking position. As shown, a screw 72 may extend through a slot 74 in the latch and may be in threaded engagement with the box cover 50. The slot 74 permits limited sliding of the latch when the screw 72 is loosened. The screw may be set up, however, to clamp the latch securely in place. Figure 4 illustrates the latch retracted from the slot 68 so as to permit the carrier to be detached from the cover of the box. If desired, a small hole 78 may be provided in the tongue 60 to receive a sealing element 80 if it is desirable to prevent unauthorized opening of the box while the switch is closed.

The cover 50 is provided on its inner face with a suitable flange 82. This telescopes within the side walls of the box 10 when the cover is closed, the flange being of sufficient width to cut off access to the interior of the box before any of the contact blades 32 reach their corresponding contact elements 14. Thus, so long as the carrier 36 remains attached to the box cover 50, all portions of this switch structure are dead when accessible to the fingers of the operator. Thus the fuses 42 can readily be removed and replaced without danger of injury to the operator. A small boss 84 may be formed on the flange 82 to bear frictionally on the wall of the box when the cover is shut so as to prevent accidental opening of the cover. The dead-front partition member 22 is preferably held in place as by a couple of screws 86 which permit removal of the partition member for inspection of the switch structure mounted behind it. By removing the dead-front partition member, and then closing the switch and detaching the switch structure from the box cover, the entire switch can be readily inspected when in closed condition.

Figure 2 illustrates in elevation a multiple switch box which may be housed in a single casing 90. As shown, the multiple structure includes two single units similar to that illustrated in Figure 1, and an intermediate unit having a dead-front partition member 92 through an opening in which a number of plug fuses 94 are exposed for removal and replacement, these fuses being of the type customarily employed for lighting circuits of low amperage. A cover 96 is hinged to a wall of the casing and can be swung shut to close the compartment containing the fuses 94. A multiple unit of this kind is useful for service including a power unit such as an electric range, and one or more lighting circuits. One of the units containing cartridge fuses can be used as a main switch controlling both the power and the lighting circuits, the other switch unit with cartridge fuses being employed to control the power circuit alone without interfering with the lighting circuits.

Various other arrangeemnts of switch units can be made, such, for example, as illustrated in Figure 5 wherein are shown two units such as illustrated in Figure 1, arranged side by side with a lower compartment for the lighting circuit fuses.

It is evident that various other modifications and changes may be made in the details of structure and the arrangement of parts without departing from the spirit or scope of the invention as defined in the following claims.

I claim:—

1. Apparatus of the class described, comprising a switch box, a dead-front partition member removably secured in said box and adjacent the side and end walls thereof, switch terminals and contact elements mounted in said box between the back wall thereof and said dead-front member, a cover hinged to said box, switch structure including contact blades mounted on said cover but detachable therefrom by external means on the outside thereof and when attached to said cover movable therewith to cause said blades to engage said contact elements, said dead-front member having narrow slots therethrough to receive said blades when the cover is swung shut, and a flange projecting from the inner face of said cover member to telescope with the box walls so as to cut off access to said switch structure before said blades move into contact with said terminals.

2. Apparatus of the class described, comprising a switch box having knock-outs in the sides thereof, an insulation member mounted in said box, switch terminals and contact elements mounted on said member, a slotted dead-front partition member removably secured in said box in front of said insulation member to mask said terminals, contact elements and associated wiring, a cover hinged to said box, switch structure detachably secured to the inner face of the cover and including contact blades movable through the slots in the dead-front partition member into contact with said contact elements, a flange on the periphery of said cover adapted to telescope with the side walls of the box when the cover is swung shut, whereby access to said contact blades is cut off before said blades reach said contact elements, and means accessible on the outside of the box cover to release said switch structure from the cover, whereby said cover can be opened wihout opening the switch.

3. Apparatus of the class described, comprising a switch box, a dead-front partition therein spaced from the rear wall of the box, switch elements mounted in said box behind said partition member, a cover member hinged on said box, a flange on said cover member adapted to telescope with the side walls of the box when the cover is closed to prevent access to the interior of the box during the final portion of closing movement of said cover, movable switch elements adapted to project through said dead-front partition for engagement with said fixed elements, a carrier for said movable elements normally secured to the inner face of said cover, and means accessible outside of the box for releasing said carrier from said cover.

4. Apparatus of the class described, comprising a switch box having a hinged cover thereon, a dead-front partition member removably mounted in said box, fixed switch elements mounted in said box behind said dead-front member, movable switch elements adapted to project through said dead-front member into contact with corresponding fixed elements so as to close the switch, shielding means including said cover normally preventing access to said movable elements when the switch is closed, and means for rendering said shielding means ineffective, whereby said movable elements may be made accessible when in contact with the fixed elements.

5. Apparatus of the class described, comprising a switch box, a stationary switch element mounted within said box, a member hinged to said box, a block of insulating material mounted on the inner face of said member, means including screws extending through said member and accessible at the outer face thereof for securing said block to said member, and a switch element mounted on said block and movable with said member into and out of operative contact with said stationary switch element.

6. Apparatus of the class described, comprising a switch box having a hinged cover thereon, a dead-front partition member removably mounted in said box, fixed switch elements mounted in said box behind said dead-front member, movable switch elements adapted to project through said dead-front member into contact with corresponding fixed elements so as to close the switch, shielding means including said cover normally preventing access to said movable elements when the switch is closed, and means including a threaded member for rendering said shielding means ineffective, whereby said movable elements may be made accessible when in contact with the fixed elements.

ERNEST G. JOHANSSON.